R. A. CONKLIN.
PLANT BOX.
APPLICATION FILED FEB. 9, 1921.
1,405,568.
Patented Feb. 7, 1922.
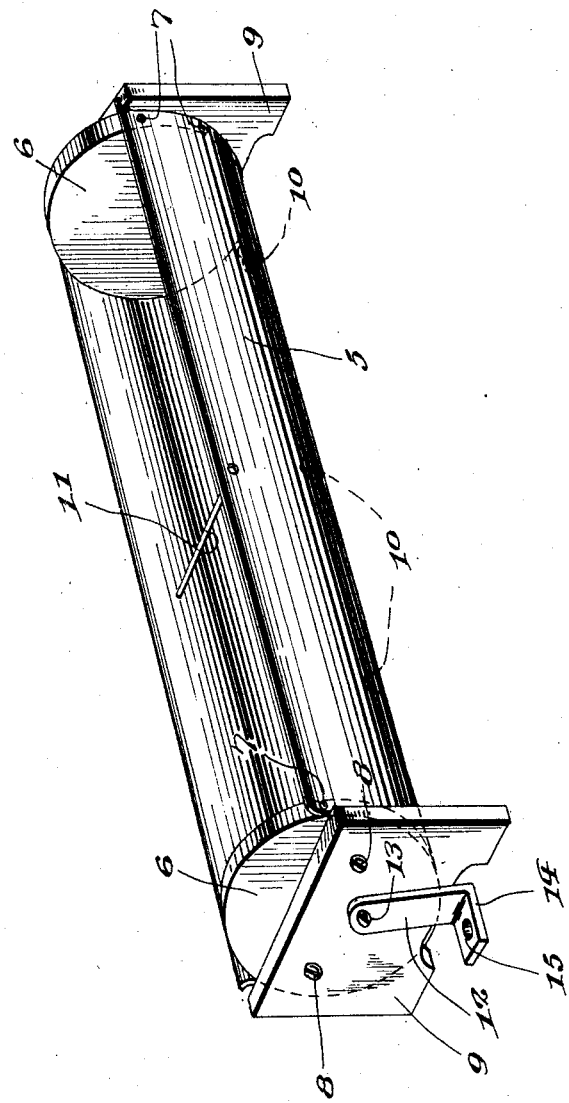
Inventor:
R. A. Conklin.

UNITED STATES PATENT OFFICE.

ROSCOE A. CONKLIN, OF CHICAGO, ILLINOIS.

PLANT BOX.

1,405,568.  Specification of Letters Patent.  Patented Feb. 7, 1922.

Application filed February 9, 1921. Serial No. 443,659.

*To all whom it may concern:*

Be it known that I, ROSCOE A. CONKLIN, a citizen of the United States, residing at Chicago, in the county of Cook and State of Illinois, have invented new and useful Improvements in Plant Boxes, of which the following is a specification.

This invention relates to boxes for supporting plants or flowers, and more particularly to boxes of the kind which are placed on window ledges, porch rails, etc.

The invention has for its object to provide a very simple and inexpensive box of the kind stated, which is so constructed that it can be shipped in knock-down form, and which can be securely held in place on the window ledge or other supporting surface.

The object is attained by means of a novel combination and arrangement of parts to be hereinafter described and claimed, and in order that the same may be better understood, reference is had to the accompanying drawing forming a part of this specification.

In the drawing, a perspective view of the device is shown.

Referring specifically to the drawing, 5 denotes a trough-shaped box which is composed of a piece of sheet metal bent at its ends partly around two circular wooden disks 6 and secured thereto by screws or other suitable fasteners 7, said disks therefore forming the end walls of the trough. The top edges of the trough are given an outward curl for a better appearance.

To the outer faces of the end walls 6 are secured by screws or other suitable fasteners 8, upright plates 9 depending slightly below the plane of the trough bottom to serve as supporting feet for the trough.

The trough 5 has holes 10 for drainage, and midway its ends it is spanned by a cross rod 11 which serves as a brace to prevent sagging and bulging where a trough of considerable length is provided.

The trough ordinarily rests squarely on a supporting surface, but when there is danger of sliding off a window ledge or porch rail, it may be fastened down by bracket irons 12 pivoted to the supporting plates 9 on the outside thereof, as shown at 13, and having lateral bends 14 at their outer ends, said bends being apertured, as shown at 15 for screws or other suitable fasteners. It will be understood that the bends are to seat on the window ledge, porch rail or other supporting surface, and the fasteners passing through the apertures 15 are driven into said surface. The bracket irons can also be swung to extend horizontally so that they may be fastened to a wall surface back of the trough, or upwardly to hang the trough from some overhead support.

The parts constituting the trough can be readily assembled, and to save space they can be shipped in knocked-down form, a number of the curved plates 5 being nested one in another.

I claim:

1. A plant box comprising a curved plate, disks around the edges of which said plate partly extends and to which it is secured, said plate and disks forming a trough, and the disks being the end walls of the trough, and supporting feet for the trough secured to the end walls thereof.

2. A plant box comprising a curved plate, disks around the edges of which said plate partly extends and to which it is secured, said plate and disks forming a trough, and the disks being the end walls of the trough, supporting feet for the trough secured to the end walls thereof, and anchoring members for the trough pivotally secured to the supporting feet.

In testimony whereof I affix my signature.

ROSCOE A. CONKLIN.